US012026046B2

(12) United States Patent
Friedrich et al.

(10) Patent No.: US 12,026,046 B2
(45) Date of Patent: Jul. 2, 2024

(54) ERROR LOG ANOMALY DETECTION

(71) Applicant: Adobe Inc., San Jose, CA (US)

(72) Inventors: Michael Gebhard Friedrich, San Francisco, CA (US); Suresh Alse, San Jose, CA (US); Nikka Michelle Mofid, Newport Coast, CA (US); Dewang Sultania, San Jose, CA (US)

(73) Assignee: Adobe Inc., San Jose, CA (US)

( * ) Notice: Subject to any disclaimer, the term of this patent is extended or adjusted under 35 U.S.C. 154(b) by 284 days.

(21) Appl. No.: 17/688,253

(22) Filed: Mar. 7, 2022

(65) Prior Publication Data

US 2023/0281068 A1    Sep. 7, 2023

(51) Int. Cl.
*G06F 11/07* (2006.01)
*G06N 20/00* (2019.01)

(52) U.S. Cl.
CPC ......... *G06F 11/0787* (2013.01); *G06N 20/00* (2019.01)

(58) Field of Classification Search
CPC ............... G06F 11/0787; G06F 11/076; G06F 11/0778; G06F 11/079; G06N 20/00; G06N 3/088; G06N 3/0455
See application file for complete search history.

(56) References Cited

U.S. PATENT DOCUMENTS

| | | | |
|---|---|---|---|
| 10,817,365 B2 | 10/2020 | Friedrich et al. | |
| 2023/0137235 A1* | 5/2023 | Chen | G06F 11/3476 714/37 |
| 2023/0177380 A1* | 6/2023 | Bansal | G06N 20/00 706/12 |

OTHER PUBLICATIONS

"Continuous delivery", Wikipedia, the free encyclopedia [retrieved Nov. 16, 2021]. Retrieved from the Internet <https://en.wikipedia.org/wiki/Continuous_delivery>., 7 Pages.

Duftler, Matt, et al., "Automated Canary Service", GitHub, Inc., Uploaded by duftler [retrieved Nov. 16, 2021]. Retrieved from the Internet <https://github.com/spinnaker/kayenta>., Jan. 27, 2017, 3 Pages.

Ehmke, Martin, "How We Automated Canary Analysis for Deployments", Adobe Tech Blog [online][retrieved Nov. 16, 2021]. Retrieved from the Internet <https://medium.com/adobetech/how-we-automated-canary-analysis-for-deployments-6a7ff88e4b7e>., Nov. 19, 2019, 7 Pages.

* cited by examiner

*Primary Examiner* — Yair Leibovich
*Assistant Examiner* — Kyle Emanuele
(74) *Attorney, Agent, or Firm* — FIG. 1 Patents

(57) ABSTRACT

Techniques are described for error log anomaly detection. In an implementation, error logs from an application are processed to generate training data. The error logs, for instance, are processed to remove personal information and other data such as numerical strings. The processed error logs are converted into embeddings to generate the training data. The training data is utilized to train an anomaly detection model. For instance, as part of training the anomaly detection model, an anomaly threshold is defined based on a loss value determined from output of the anomaly detection model. Further error logs from the application are then processed by the trained anomaly detection model to determine which of the further error logs are error anomalies, such as based on comparing loss values for the further error logs to the anomaly threshold.

20 Claims, 8 Drawing Sheets

ERROR LOG ANOMALY DETECTION

BACKGROUND

Computing systems execute software to provide users with a variety of different functionality such as for productivity tasks, communication, entertainment, and so forth. Further, developers are constantly developing new software and improvements to existing software. One challenge in software development is identifying and fixing errors (e.g., bugs) in software that cause malfunctions and/or inefficiencies in software execution. To enable software errors to be identified and repaired, error logs are generated that describe errors that occur during software execution. An error log, for instance, include various information that describes a context for a particular software error. A developer and/or other personnel can utilize error logs to determine why a particular error occurred during execution of software and attempt to apply a fix to the software to avoid reoccurrence of the error.

Conventional error detection systems for generating and analyzing software error logs experience a number of drawbacks. For instance, some systems utilize human interaction to analyze and annotate error logs generated from software errors before the error logs are processed by the system to identify errors for correction. Further, some systems utilize complex error log processes that are resource intensive and utilize algorithms that are frequently trained using very large data sets. Thus, software error detection techniques in conventional systems are burdensome on user and system resources (e.g., memory and processor bandwidth), require large sets of training data that are difficult and expensive to obtain, and/or do not scale to large sets of software services.

SUMMARY

Techniques are described for error log anomaly detection. In an implementation, error logs from an application are processed to generate training data. The error logs, for instance, are processed to remove personal information and other data such as numerical strings. The processed error logs are converted into embeddings to generate the training data. The training data is utilized to train an anomaly detection model. For instance, as part of training the anomaly detection model, an anomaly threshold is defined based on loss values determined from output of the anomaly detection model. Further error logs from the application are then processed by the trained anomaly detection model to determine which of the further error logs are error anomalies, such as based on comparing loss values for the further error logs to the anomaly threshold.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
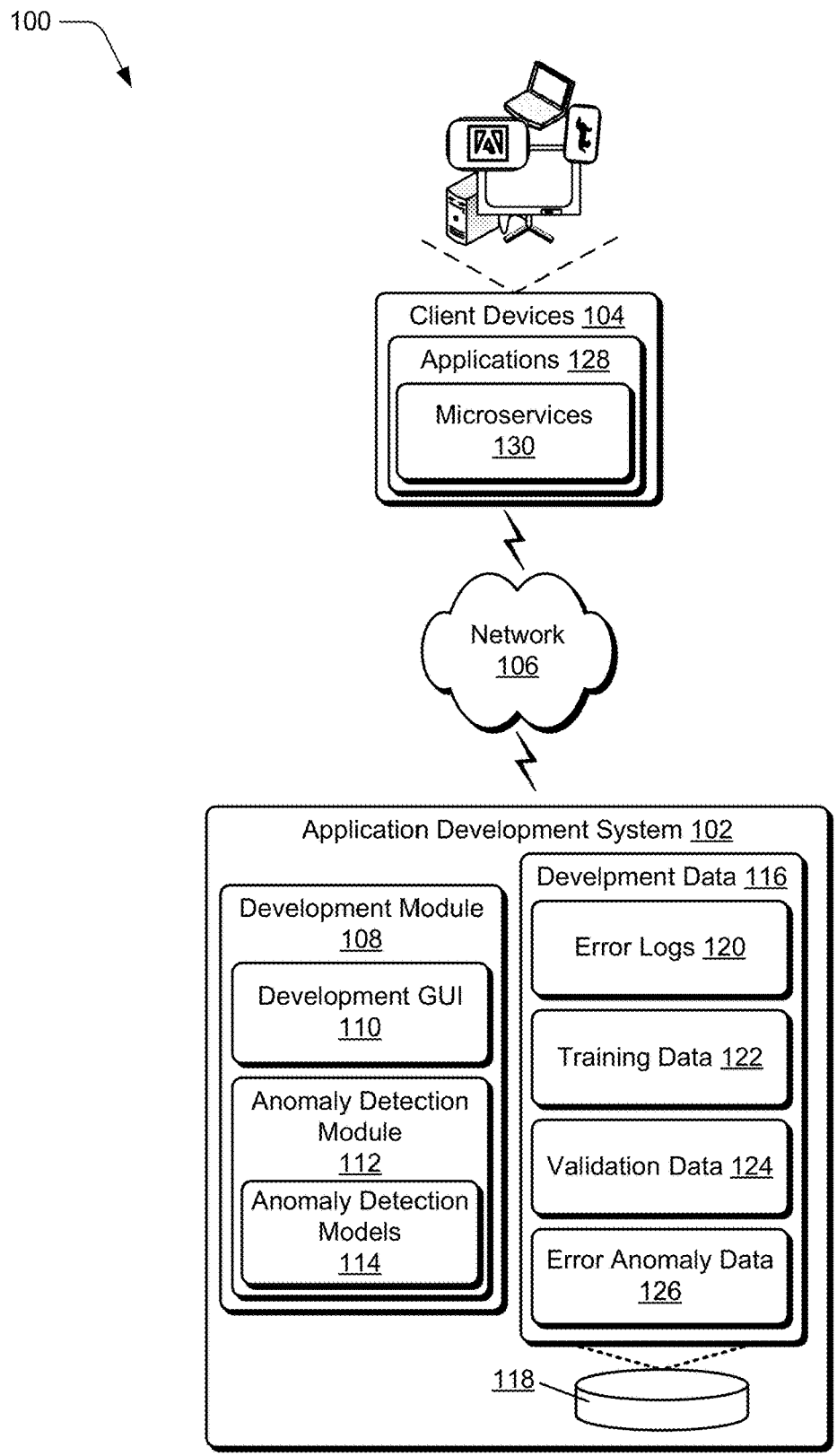
FIG. 1 is an illustration of an environment in an example implementation that is operable to employ error log anomaly detection as described herein.

To overcome the challenges to identifying and mitigating software errors presented in conventional error detection systems, error log anomaly detection is leveraged in a digital medium environment. For instance, to mitigate the challenges of excessive burden on system resources experienced when attempting to identify software errors using conventional error detection systems, the described techniques provide for error anomaly detection for applications using machine learning model training techniques that are less resource and time intensive than those utilized in conventional systems. For instance, conventional systems typically utilize large static training data sets that are generated over a discrete period of time and that lose relevancy over time. Further, training error detection algorithms utilizing such large static training data sets is resource and time intensive.

Accordingly, techniques described herein mitigate these challenges with conventional systems by utilizing machine learning models trained using efficient training techniques that reduce training time, processing time (e.g., inference time), and utilize training data sets that maintain relevancy to current application conditions. For instance, to train a machine learning model to identify error anomalies that occur in conjunction with execution of an application, error logs generated based on errors that occur during application execution are gathered for a specified time window, e.g., 30 days of error logs. The error logs are then processed to remove personally identifiable information (PII) and noise such as numerical strings from the error logs. By removing PII, for instance, user privacy is protected. Further, removing noise from the error logs reduces training burden and increases performance of a trained model. The processed error logs are then converted into embeddings (e.g., vectors) that are used as training data. The training data is utilized to train an anomaly detection model such as using unsupervised training to detect error anomalies that occur in the error logs. Further, in conjunction with training the anomaly detection model, an anomaly threshold is defined such as by correlating loss values to error anomalies identified in the training data. For instance, loss values output by the anomaly detection model from a final training epoch are utilized to define the anomaly threshold.

After training an anomaly detection model using the initial training data set, further error logs from the application are processed by the trained anomaly detection model to identify error anomalies in the further error logs. For instance, loss values from output of the trained anomaly detection model are compared to an anomaly threshold for the anomaly detection model, and error logs with loss values that meet or exceed the anomaly threshold are identified as error anomalies. An error anomaly, for instance, represents an error that deviates from a commonly observed error, such as an error introduced by changes made to application code, e.g., updates. By identifying error anomalies, for example, remedial actions can be taken to repair an application, such as to perform bug fixes to attempt to prevent reoccurrence of an identified error.

Further to the described techniques, an anomaly detection model is dynamically trainable, such as using error logs generated by an application over a sliding time window to periodically and/or continuously train and update the anomaly detection model. For instance, when the anomaly detection model is initially trained using error logs generated over a first time window (e.g., 30 days), the anomaly detection model is subsequently trainable using error logs generated over a second time window (e.g., a subsequent 30 days) to update the anomaly detection model. This enables the described techniques to adapt to changes in application context (e.g., updates) such that an anomaly detection model maintains relevancy and accurately identifies error anomalies based on a current application context.

Accordingly, the described techniques provide efficient and accurate ways for utilizing machine learning techniques to identify error anomalies that reduce the burden on system resources experienced in conventional error detection techniques. Further, utilizing the described techniques enables software errors (e.g., execution errors) to be quickly and efficiently identified such that remedial actions are applied to repair the errors.

Example Environment

FIG. 1 is an illustration of an environment 100 in an example implementation that is operable to employ error log anomaly detection as described herein. The illustrated environment 100 includes an application development system 102 interconnected with client devices 104 via a network 106. The application development system 102 and the client devices 104, for instance, are configured to communicate with one another to perform various aspects of error log anomaly detection described herein. Generally, the network 106 represents a combination of wired and wireless networks and is implemented via any suitable architecture.

Examples of computing devices that are used to implement the application development system 102 include a desktop computer, a server device, multiple interconnected computing devices, and so forth. Additionally, the application development system 102 is implementable using a plurality of different devices, such as multiple servers utilized by an enterprise to perform operations "over the cloud" as further described in relation to FIG. 8. The client devices 104 are implementable via a variety of different device types including a desktop computer, a laptop computer, a mobile device (e.g., assuming a handheld configuration such as a tablet or mobile phone), a server device, and so forth.

The application development system 102 includes a development module 108 that is representative of functionality to enable various aspects of error log anomaly detection to be performed via the application development system 102. Accordingly, the development module 108 implements a development graphical user interface (GUI) 110 and an anomaly detection module 112. Generally, the development GUI 110 represents functionality for receiving user interaction to perform various anomaly detection actions, as well as to output visual indications of anomaly detection actions. Further, the anomaly detection module 112 represents functionality for detecting anomalies in error logs, such as utilizing techniques for error log anomaly detection. The anomaly detection module 112, for instance, leverages a set of machine learning algorithms in the form of anomaly detection models 114 for detecting anomalies in error logs.

The application development system 102 further includes development data 116 stored on a storage 118. Generally, the development data 116 represents data that is utilized by and results from operation of the development module 108. The development data 116, for instance, includes error logs 120, training data 122, validation data 124, error anomaly data 126, and/or combinations thereof. These different examples of the development data 116 are not mutually exclusive and are combinable in different ways such as to generate different collections of development data 116 that include overlapping sets of data. The error logs 120 represent data sets that are generated based on errors detected during execution of software, such as applications. The error logs 120 are receivable from various sources such as end-user devices, cloud-based application instances, network application servers, and so forth. In at least one implementation error logs 120 are received from instances of the client devices 104.

The training data 122 represents data utilized by the anomaly detection module 112 for training the anomaly detection models 114 and the validation data 124 represents data utilized by the anomaly detection module 112 for validation of the anomaly detection models 114. Further examples and attributes of the training data 122 and the validation data 124 are described below. The error anomaly data 126 represents data describing anomalies detected in the error logs 120. For example, instances of the error logs 120 are processed using the anomaly detection models 114 to detect anomalies in the error logs 120 and generate the error anomaly data 126 based on the detected anomalies.

The client devices 104 include and/or have access to applications 128 which utilize microservices 130. The applications 128 enable various tasks to be performed via the client devices 104 such as productivity tasks, communication tasks, entertainment, and so forth. Further, the microservices 130 support different attributes of the applications 128. In at least one implementation the error logs 120 are generated based on errors that occur in conjunction with execution of the applications 128 and/or the microservices 130. For instance, at least some of the error logs 120 are communicated from the client devices 104 to the application development system 102, such as over the network 106.

Having considered an example environment and system, consider now a discussion of some example details of the techniques for error log anomaly detection in a digital medium environment in accordance with one or more implementations.

Figure 2:
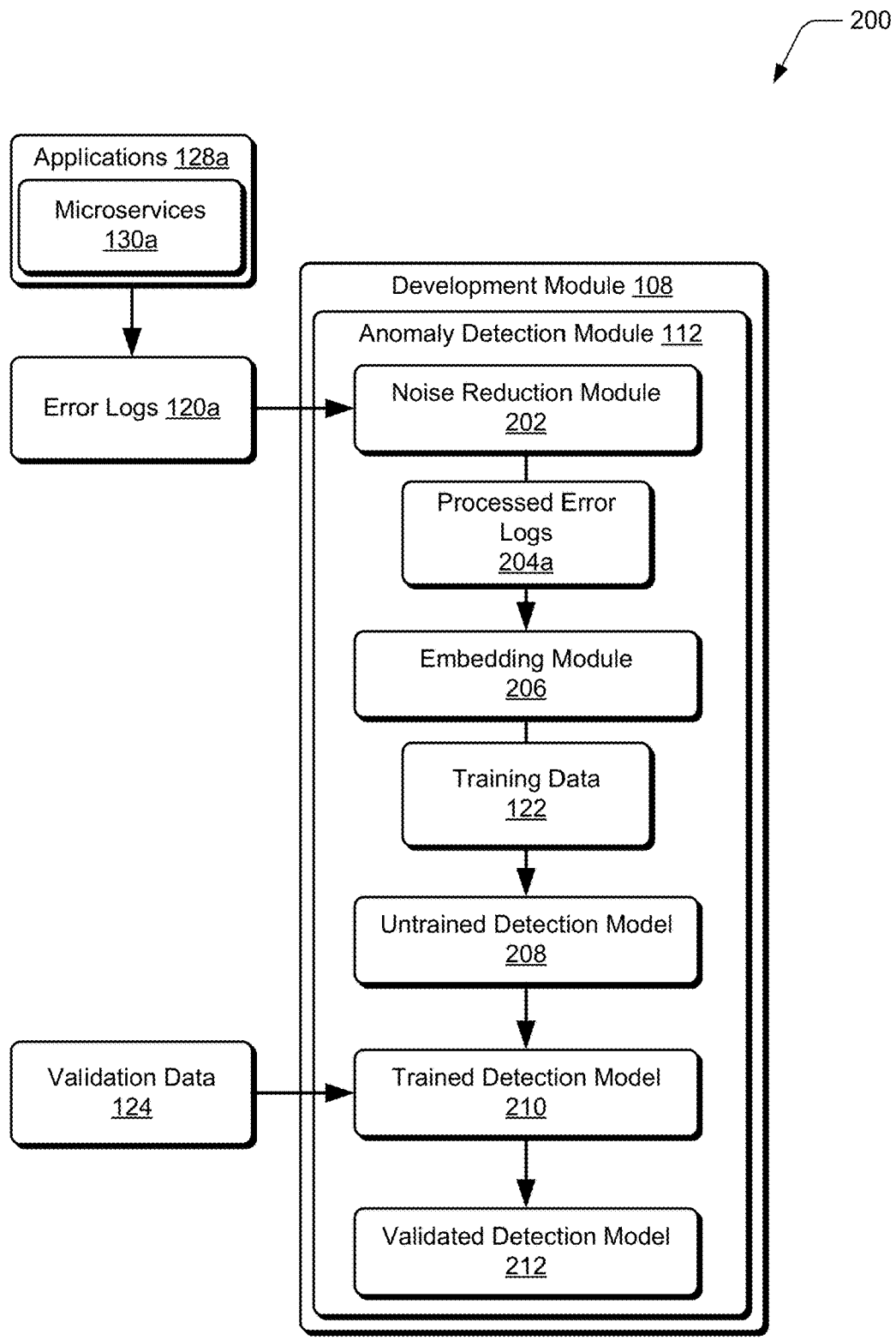
FIG. 2 depicts an example system for training and validating an anomaly detection model in accordance with one or more implementations.

FIG. 2 depicts an example system 200 for training and validating an anomaly detection model in accordance with one or more implementations. The system 200 incorporates features of the environment 100 and is operable within the context of the environment 100. In the system 200 the anomaly detection module 112 receives error logs 120a and processes the error logs 120a using a noise reduction module 202 to generate processed error logs 204a. The error logs 120a, for instance, represent a set of error logs received from microservices 130a of an application 128a.

As part of processing the error logs 120a, for example, the noise reduction module 202 cleans and extracts messages from the training data to generate the processed error logs 204a. In at least one example, to reduce noise in the error logs 120a, data such as user identifiers, numbers, numerical strings, etc., are removed by the noise reduction module 202 and replaced with whitespaces and/or placeholders. For instance, the noise reduction module 202 removes personally identifiable information (PII) from the error logs 120a to generate the processed error logs 204a. In at least one implementation the processed error logs 204a represent text strings generated from the error logs 120a.

The anomaly detection module 112 leverages an embedding module 206 to process the processed error logs 204a and generate training data 122. The embedding module 206, for instance, converts text strings from the processed error logs 204a into numerical strings (e.g., vectors) to generate the training data 122. In an example implementation the processed error logs 204a include individual text sentences extracted from the error logs 120a. Accordingly, for instances of text sentences from the processed error logs 204a, the embedding module 206 generates a word embedding for each word of the sentence and averages the word embeddings to obtain an average text embedding for the sentence. An average text embedding generated from each sentence in the processed error logs 204a is then usable by the embedding module 206 to generate the training data 122. Various embedding algorithms are utilizable by the embedding module 206 to generate the training data 122, such as a Bidirectional Encoder Representations from Transformers (BERT) machine learning algorithm.

Further to the system 200 the anomaly detection module 112 trains an untrained detection model 208 using the training data 122 to generate a trained detection model 210. The trained detection model 210, for example, represents an instance of the anomaly detection models 114. In at least one implementation the training data 122 is unlabeled and the anomaly detection module 112 trains the untrained detection model 208 utilizing an unsupervised machine learning training technique such as unsupervised k-means clustering using the training data 122.

After the trained detection model 210 is generated the validation data 124 is input to the trained detection model 210 to identify the trained detection model 210 as a validated detection model 212. In at least one implementation the validation data 124 is associated with the training data 122 and includes labeled error messages that are labeled to indicate whether an error message is an anomaly or not.

As part of validating the trained detection model 210, for instance, the anomaly detection module 112 inputs the validation data 124 into the trained detection model 210 and compares output of the trained detection model 210 to known values for the validation data 124 to determine a performance value for the trained detection model 210. A performance value for the trained detection model 210 is definable in various ways, such as an F-score (e.g., F1 score), a precision score, a recall score, and/or combinations thereof. Thus, a performance value of the trained detection model 210 is compared to a threshold value and if the performance value meets and/or exceeds the threshold value, the trained detection model 210 is determined to be validated. In at least one implementation, the trained detection model 210 is operable independent of validation using validation data with known anomalies, such as in scenarios where such validation data is unavailable.

Figure 3:
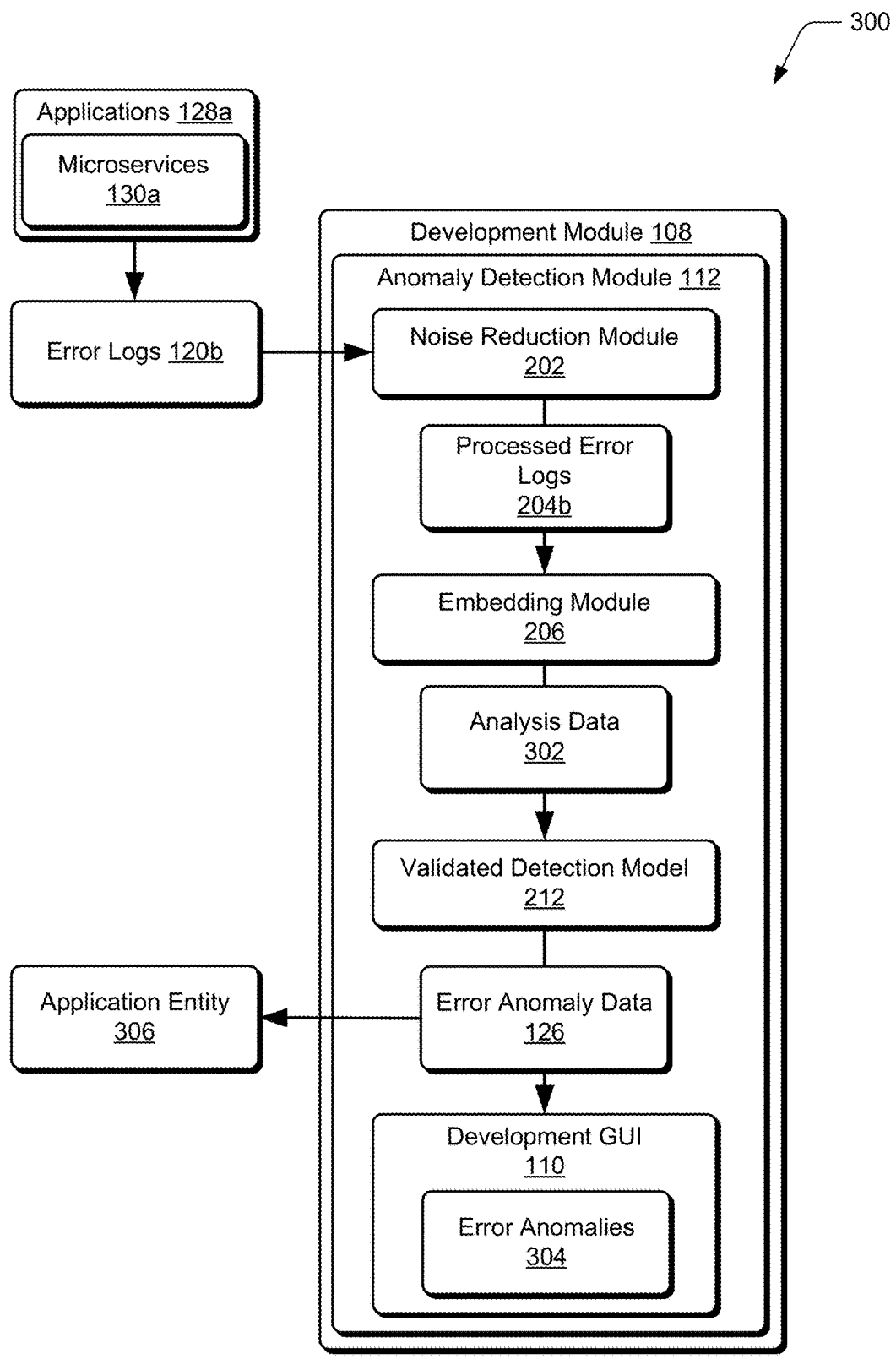
FIG. 3 depicts an example system for utilizing an anomaly detection model to identify anomalies in error logs in accordance with one or more implementations.

FIG. 3 depicts an example system 300 for utilizing an anomaly detection model to identify anomalies in error logs in accordance with one or more implementations. The system 300 incorporates features of the environment 100 and is operable within the context of the environment 100. In at least one implementation, the system 300 represents an extension and/or continuation of the system 200.

In the system 300 error logs 120b are processed by the noise reduction module 202 to generate processed error logs 204b. The error logs 120b, for instance, represent further error logs from the microservices 130a of the application 128a, e.g., different error logs than the error logs 120a used for training. This is not to be construed as limiting, however, and in at least some implementations the error logs 120b include at least some of the error logs 120a. Different ways for processing error logs by the noise reduction module 202 are discussed above. The processed error logs 204b are processed by the embedding module 206 to generate analysis data 302. The analysis data 302, for instance, includes vector representations of the processed error logs 120b. Different ways for processing the processed error logs 204b by the embedding module 206 are discussed above.

Further to the system 300, the analysis data 302 is input to the validated detection model 212 and the validated detection model 212 processes the analysis data 302 and outputs error anomaly data 126 that identifies which of the error logs 120b represent error anomalies. The error anomaly data 126 is usable in various ways. For instance, the development module 108 outputs error anomalies 304 in the development GUI 110 visually identifying various information from the error anomaly data 126, such as which of the error logs 120a represent anomalies, specific error types identified as anomalies, a number of identified anomalies, a percentage of the error logs 120a identified as anomalies, and so forth. In at least one implementation the development module 108 utilizes the error anomaly data 126 to identify an attribute of the microservices 130a that cause the error anomalies 304. For instance, the development module 108 identifies a software error and/or an execution condition that causes the error anomalies 304. The development module 108 is operable to perform a repair action to correct the attribute that causes the error anomalies 304, such as a change to code of the microservices 130a to prevent further occurrence of the error anomalies 304 in conjunction with execution of the microservices 130a.

Alternatively or additionally, the development module 108 communicates (e.g., transmits) the error anomaly data 126 over the network 106 to an application entity 306. The application entity 306, for instance, represents an entity that develops and/or publishes the application 128a. Thus, the application entity 306 is able to utilize the error anomaly data 126 in various ways, such as to identify errors in code of the application 128 and to repair the errors.

Figure 4:
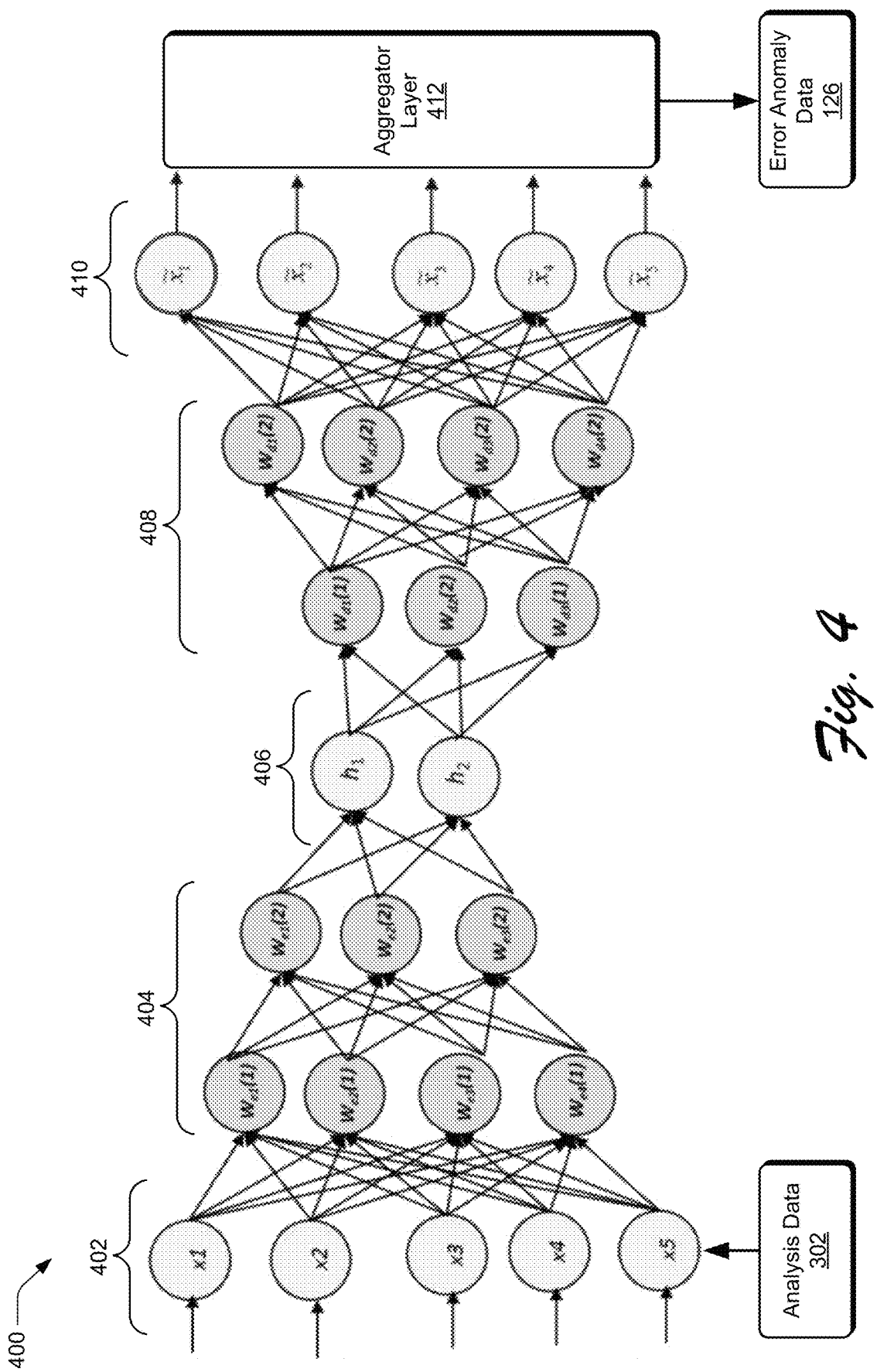
FIG. 4 depicts an implementation of an anomaly detection model that is operable to identify error anomalies in error logs in accordance with one or more implementations.

FIG. 4 depicts an implementation of an anomaly detection model 400 that is operable to identify error anomalies in error logs in accordance with one or more implementations. In at least one implementation the anomaly detection model 400 represents an instance of the trained detection model 210 and/or an anomaly detection model 114. The anomaly detection model 400 is implementable using a variety of different architectures, such as an autoencoder neural network.

As part of techniques for error log anomaly detection described herein, the anomaly detection model 400 includes an input layer 402 that receives the analysis data 302 and an encoder layer 404 encodes the analysis data 302 to generate encoded input 406. In at least one implementation the encoder layer 404 includes multiple linear encoder layers that apply a rectified linear activation (ReLU) function to the analysis data 302 to generate the encoded input 406. A decoder layer 408 processes the encoded input 406 to generate a decoded output layer 410. In at least one implementation the decoder layer 408 includes multiple linear layers that apply a ReLU activation function to the encoded input 406 to generate the decoded output layer 410.

An aggregator layer 412 takes output from the output layer 410 and generates the error anomaly data 126. The aggregator layer 412, for instance, aggregates loss values from the output layer 410 and determines a reconstruction error of the detection model 400, e.g., utilizing means squared error of the loss values of the output layer 410. In a training phase the aggregator layer 412 is operable to generate the error anomaly data 126 to include an anomaly threshold based on loss values from the output layer 410. In an error log prediction phase (e.g., inference phase) the aggregator layer 412 is operable to generate the error anomaly data 126 to include predictions of whether input error logs 120 represent anomalies or not.

According to various implementations, an anomaly threshold is determined in conjunction with training and/or validating the detection model 400. The detection module 400 is then implemented to detect anomalies by using a reconstruction error (e.g., an error calculated between the input layer 402 and its reconstruction at the output layer 410) as an anomaly score for error logs. For instance, the encoder layer 404 encodes the analysis data 302 and the decoder layer 408 attempts to recreate the analysis data 302 from the encoding, learning salient features of error logs in the process. In at least one implementation anomaly scores for instances of error logs processed by the anomaly detection model 400 are compared to an anomaly threshold to determine whether error logs represent anomalies. For instance, error logs with anomaly scores that meet and/or exceed the anomaly threshold are identified as anomalies.

Figure 5:
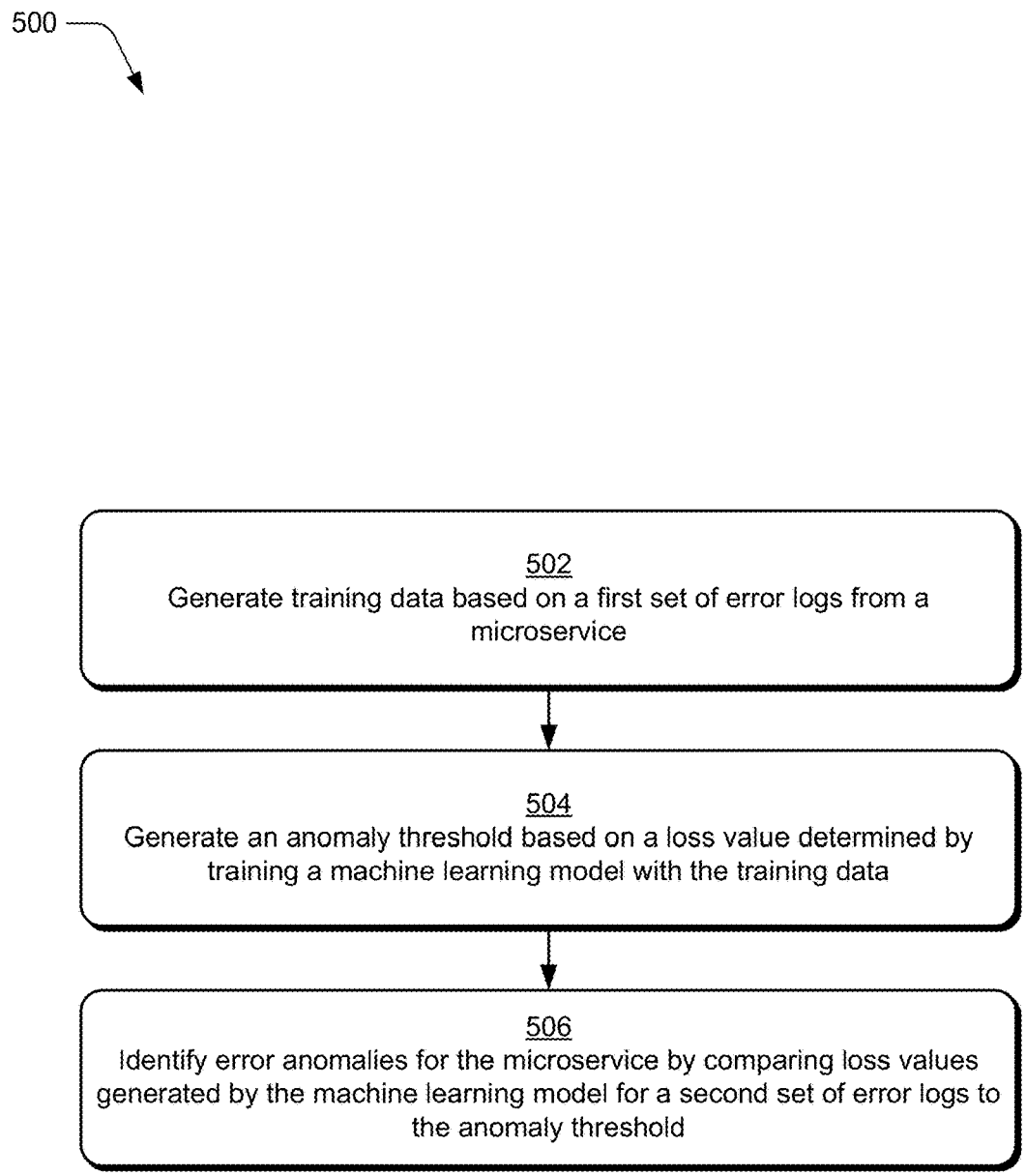
FIG. 5 depicts a flow chart describing an example method for error log anomaly detection.

Having discussed some implementation details, consider now some example methods for error log anomaly detection. FIG. 5 depicts a flow chart describing an example method 500 for error log anomaly detection. In at least one implementation, the method is performed by the anomaly detection module 112, such as described above. Step 502 generates training data based on a first set of error logs from a microservice. The anomaly detection module 112, for instance, obtains a first set of error logs from a microservice and leverages the noise reduction module 202 to process the first set of error logs to remove PII and other data such as numbers. The anomaly detection module 112 leverages the embedding module 206 to generate log embeddings from the processed first set of error logs to generate training data. In at least one implementation, generating the log embeddings includes generating word embeddings for each word in an error log, and averaging the word embeddings to generating a log embedding for the error log.

Step 504 generates an anomaly threshold based on a loss value determined by training a machine learning model with the training data. The anomaly detection module 112, for instance, trains an anomaly detection model 114 using the training data and as part of the training determines a loss value from output of the anomaly detection model 114. The anomaly detection module 112 defines the anomaly threshold based on the loss value. In at least one implementation, defining the anomaly threshold includes determining the loss value as an average mean squared loss value between the training data input to the anomaly detection model 114 and the output of the anomaly detection model 114 at a final (e.g., last) epoch of the anomaly detection model 114. Further, the anomaly detection module 112 determines a standard deviation value between loss values for the output of the anomaly detection model 114, and defines the anomaly threshold as the average mean squared loss plus a multiple of the standard deviation value.

Step 506 identifies error anomalies for the microservice by comparing loss values generated by the machine learning model for a second set of error logs to the anomaly threshold. The anomaly detection module 112, for instance, inputs a second set of error logs from the microservice into the trained and/or validated anomaly detection model 114 and determines loss values for the error logs based on output from the anomaly detection module 112. The anomaly detection module 112 compares the loss values to the anomaly threshold to identify error logs from the second set of error logs with loss values that meet and/or exceed the anomaly threshold as error anomalies.

According to various implementations the method 500 is performable dynamically such as to tune performance of the anomaly detection module 112. For instance, an anomaly detection model 114 is trained and retrained over time such that the anomaly detection mode 1114 adjusts to changes in applications and/or microservices, and/or changes in execution conditions pertaining to applications and/or microservices.

Figure 6:
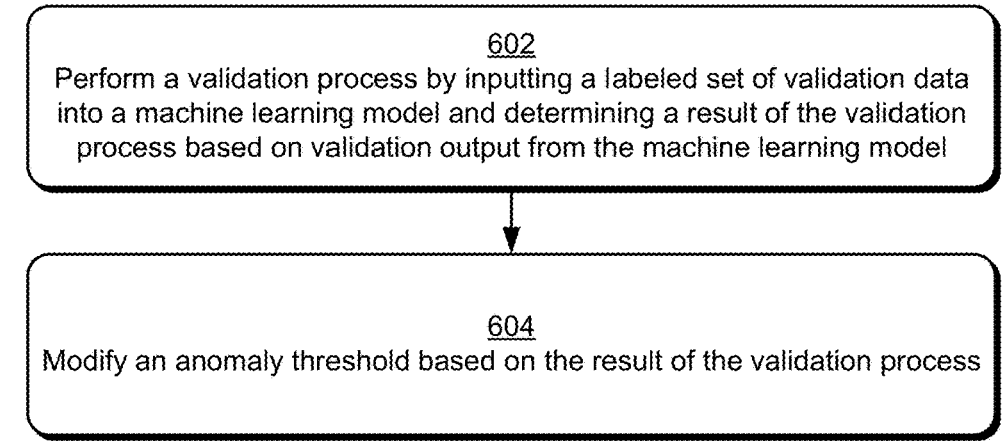
FIG. 6 depicts a flow chart describing an example method for validating a machine learning model.

FIG. 6 depicts a flow chart describing an example method 600 for validating a machine learning model. In at least one implementation, the method is performed by the anomaly detection module 112, such as described above. The method 600, for instance, is implemented in conjunction with the method 500.

Step 602 performs a validation process by inputting a labeled set of validation data into a machine learning model and determining a result of the validation process based on validation output from the machine learning model. The anomaly detection module 112, for instance, inputs validation data 124 into the trained detection model 210 and compares output of the trained detection model 210 to the original validation data 124. The validation data 124, for instance, includes error logs that are labeled as either anomalies or not anomalies. Thus, by comparing output of the trained detection model 210, the anomaly detection module 112 determines whether the trained anomaly detection model 114 achieves a validation threshold. The anomaly detection module 114, for instance, determines a validation score for the trained anomaly detection module 112 based on output of the validation process. The validation score and the validation threshold are definable in various ways, such as a threshold F-score, a threshold precision score, a threshold recall score, and/or combinations thereof.

Step 604 modifies an anomaly threshold based on the result of the validation process. For instance, where a validation score for the trained anomaly detection model 114 is below an anomaly threshold, the anomaly threshold is reduced such as to correspond to the validation score.

Figure 7:
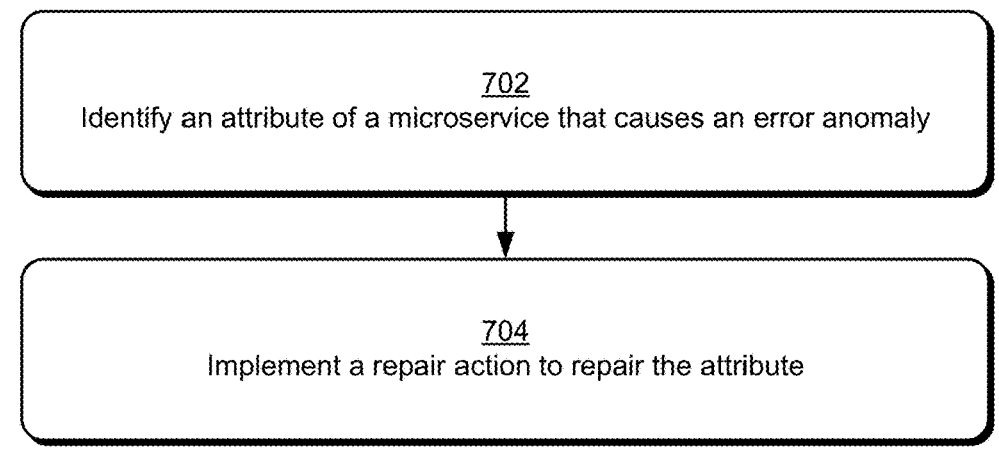
FIG. 7 depicts a flow chart describing an example method for performing an action based on identifying error anomalies.

FIG. 7 depicts a flow chart describing an example method 700 for performing an action based on identifying error anomalies. In at least one implementation, the method is performed by the anomaly detection module 112, such as described above. The method 700, for instance, is implemented in conjunction with the method 500.

Step 702 identifies an attribute of a microservice that causes an error anomaly. The development module 108, for instance, identifies microservice code and/or an execution condition of a microservice that causes an identified error anomaly. In at least one implementation the development module 108 utilizes an automated process (e.g., automated bug tracking) that determines microservice code that generates an error anomaly.

Step 704 implements a repair action to repair the attribute. The development module 108, for example, modifies microservice code to prevent the microservice from causing an error identified by the error anomaly. In at least one implementation the application development system 102 deploys the repair action to a network entity that provides the microservice to cause a modification of the microservice at the network entity. Alternatively or additionally the development module 108 generates an alert identifying the error anomaly and outputs the alert, such as part of the development GUI 110, by communicating the alert to another entity (e.g., a network entity that manages and/or exposes the microservice), and so forth.

The example methods described above are performable in various ways, such as for implementing different aspects of the systems and scenarios described herein. For instance, aspects of the methods are implemented by the development module 108 and various aspects of the methods are implemented via the different GUIs described above. Generally, any services, components, modules, methods, and/or operations described herein are able to be implemented using software, firmware, hardware (e.g., fixed logic circuitry), manual processing, or any combination thereof. Some operations of the described methods, for example, are described in the general context of executable instructions stored on computer-readable storage memory that is local and/or remote to a computer processing system, and implementations include software applications, programs, functions, and the like. Alternatively or in addition, any of the functionality described herein is performable, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations are able to be performed in any order to perform a method, or an alternate method.

Having described example procedures in accordance with one or more implementations, consider now an example system and device that are able to be utilized to implement the various techniques described herein.

Example System and Device

Figure 8:
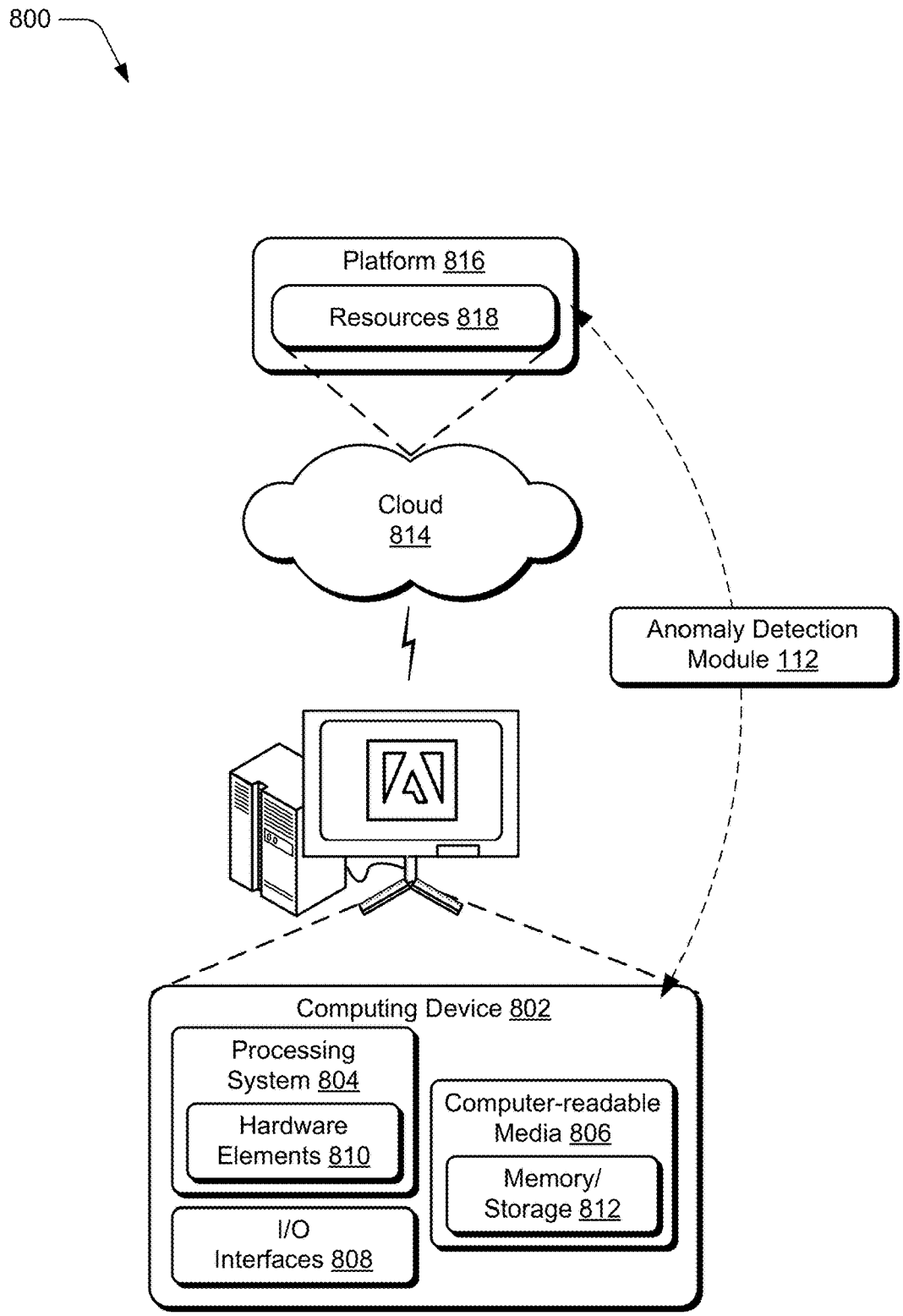
FIG. 8 illustrates an example system that includes an example computing device that is representative of one or more computing systems and/or devices that are usable to implement the various techniques described herein.

FIG. 8 illustrates an example system 800 that includes an example computing device 802 that is representative of one or more computing systems and/or devices that are usable to implement the various techniques described herein. This is illustrated through inclusion of the anomaly detection module 112. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are be configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage component 812 includes volatile media (such as random access memory (RANI)) and/or nonvolatile media (such as read only memory (ROM), Flash memory, optical disks, magnetic disks, and so forth). In another example, the memory/storage component 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    generating, by a processing device, training data stored in computer-readable storage by obtaining a first set of error logs from a microservice, processing the first set of error logs to remove personally identifiable information, and generating log embeddings from the processed first set of error logs to generate the training data;
    generating, by the processing device, an anomaly threshold by inputting the training data to a machine learning model that is unsupervised, determining loss values from output of the machine learning model, and defining the anomaly threshold based on one or more loss values of a final epoch of the machine learning model;
    identifying, by the processing device, one or more error anomalies for the microservice by inputting a second set of error logs from the microservice into the machine learning model, comparing loss values for output from the machine learning model to the anomaly threshold, and identifying error logs from the second set of error logs with loss values that exceed the anomaly threshold as the error anomalies; and
    causing, by the processing device, a microservice repair to attempt to prevent reoccurrence of the one or more error anomalies.

2. The method as described in claim 1, wherein said generating the training data further comprises removing numerical strings from the first set of error logs and replacing the personally identifiable information and the numerical strings with one or more of whitespaces or placeholders for generating the embeddings.

3. The method as described in claim 1, wherein said generating log embeddings comprises, for each error log of the first set of error logs:
generating word embeddings for each word in the error log; and
averaging the word embeddings to generating a log embedding for the error log.

4. The method as described in claim 1, wherein the one or more loss values represent a reconstruction error calculated between the training data input to the machine learning model and the output of the machine learning model.

5. The method as described in claim 1, wherein said defining the anomaly threshold further comprises determining the one or more loss values as an average mean squared loss value between the training data input to the machine learning model and the output of the machine learning model.

6. The method as described in claim 5, wherein said defining the anomaly threshold further comprises determining a standard deviation value between loss values for the output of the machine learning model, and defining the anomaly threshold as the average mean squared loss plus a multiple of the standard deviation value.

7. The method as described in claim 6, further comprising:
performing, by the processing device, a validation process by inputting a labeled set of validation data into the machine learning model and determining a result of the validation process based on validation output from the machine learning model; and
modifying, by the processing device, the anomaly threshold based on the result of the validation process.

8. The method as described in claim 1, wherein the first set of error logs represent error logs generated from the microservice over a first period of time, and wherein the method further comprises:
generating, by the processing device, further training data based on a third set of error logs generated from the microservice, wherein the third set of error logs are generated from the microservice over a second period of time;
modifying, by the processing device, the anomaly threshold by inputting the further training data to the machine learning model, determining a further loss value from output of the machine learning model, and generating a modified anomaly threshold based on the further loss value; and
identifying, by the processing device, one or more further error anomalies for the microservice by inputting a fourth set of error logs from the microservice into the machine learning model, comparing further loss values for output from the machine learning model to the modified anomaly threshold, and identifying error logs from the fourth set of error logs with loss values that exceed anomaly threshold as the error anomalies.

9. The method as described in claim 1, further comprising:
identifying, by the processing device, an attribute of the microservice that causes one or more of the error anomalies; and
implementing, by the processing device, a repair action to repair the attribute.

10. The method as described in claim 9, wherein said implementing the repair action comprises deploying the repair action to a network entity that provides the microservice to cause a modification of the microservice at the network entity.

11. A system comprising:
a memory component; and
a processing device coupled to the memory component, the processing device configured to perform operations comprising:
processing a first set of error logs from a microservice to remove personally identifiable information;
converting the processed first set of error logs into embeddings to generate training data;
inputting the training data to a machine learning model that is unsupervised, determining loss values from output of the machine learning model, and defining an anomaly threshold based on one or more loss values of a final epoch of the machine learning model;
inputting a second set of error logs from the microservice into the machine learning model, comparing loss values for output from the machine learning model to the anomaly threshold, and identifying error logs from the second set of error logs with loss values that exceed the anomaly threshold as error anomalies; and
causing a microservice repair to attempt to prevent reoccurrence of the error anomalies.

12. A system as described in claim 11, wherein processing the first set of error logs includes removing numerical strings from the first set of error logs and replacing the personally identifiable information and the numerical strings with one or more of whitespaces or placeholders.

13. A system as described in claim 11, wherein to defining the anomaly threshold includes determining the loss value as an average mean squared loss value between the training data input to the machine learning model and the output of the machine learning model.

14. A system as described in claim 13, wherein defining the anomaly threshold further comprises determining a standard deviation value between loss values for the output of the machine learning model, and defining the anomaly threshold as the average mean squared loss plus a multiple of the standard deviation value.

15. A system as described in claim 14, wherein the processing device is further configured to perform operations comprising:
performing a validation process including to input a labeled set of validation data into the machine learning model and determining a result of the validation process based on validation output from the machine learning model; and
modifying the anomaly threshold based on the result of the validation process.

16. A system as described in claim 11, wherein the processing device is further configured to perform operations comprising:
identifying an attribute of the microservice that causes one or more of the error anomalies; and
implementing a repair action to repair the attribute.

17. A system as described in claim 16, wherein implementing the repair action includes deploying the repair action to a network entity that provides the microservice to cause a modification of the microservice at the network entity.

18. One or more computer-readable storage media having stored instructions that, when executed by a computing device, causes the computing device to perform operations comprising:
- generating training data stored in computer-readable storage by obtaining a first set of error logs from a microservice, processing the first set of error logs to remove personally identifiable information, and generating embeddings from the processed first set of error logs to generate the training data;
- generating an anomaly threshold by inputting the training data to a machine learning model that is unsupervised, determining loss values from output of the machine learning model, and defining the anomaly threshold based on one or more loss values of a final epoch of the machine learning model;
- identifying one or more error anomalies for the microservice by inputting a second set of error logs from the microservice into the machine learning model, comparing loss values for output from the machine learning model to the anomaly threshold, and identifying error logs from the second set of error logs with loss values that exceed the anomaly threshold as the error anomalies;
- identifying an attribute of the microservice that causes one or more of the error anomalies, and implementing a repair action to repair the attribute; and
- causing a microservice repair to attempt to prevent reoccurrence of the error anomalies.

19. One or more computer-readable storage media of claim 18, wherein said defining the anomaly threshold further comprises determining the loss value as an average mean squared loss value between the training data input to the machine learning model and the output of the machine learning model.

20. One or more computer-readable storage media of claim 19, wherein said defining the anomaly threshold further comprises determining a standard deviation value between loss values for the output of the machine learning model, and defining the anomaly threshold as the average mean squared loss plus a multiple of the standard deviation value, and wherein the operations further comprise:
- performing a validation process by inputting a labeled set of validation data into the machine learning model and determining a result of the validation process based on validation output from the machine learning model; and
- modifying the anomaly threshold based on the result of the validation process.

* * * * *